United States Patent [19]
Yamashita et al.

[11] Patent Number: 6,014,300
[45] Date of Patent: Jan. 11, 2000

[54] POWER SOURCE CIRCUIT

[75] Inventors: Koichi Yamashita; Hiroaki Sugiura; Tetsuya Kuno; Narihiro Matoba, all of Tokyo, Japan

[73] Assignee: Mitsubishi Denki Kabushiki Kaisha, Tokyo, Japan

[21] Appl. No.: 09/093,877

[22] Filed: Jun. 9, 1998

[30] Foreign Application Priority Data

Jun. 17, 1997 [JP] Japan ................................. 9-159902

[51] Int. Cl.[7] ...................................................... H02H 3/00
[52] U.S. Cl. ................... 361/92; 361/23; 361/58; 361/115
[58] Field of Search ............................... 361/115, 23, 24, 361/25, 58, 113, 111, 118, 90, 92

[56] References Cited

FOREIGN PATENT DOCUMENTS

| 196780 | 6/1989 | Japan | ................................. H02M 3/28 |
| 6-339267 | 12/1994 | Japan | ................................. H02M 3/28 |
| 7-274528 | 10/1995 | Japan | ................................. H02M 7/48 |

OTHER PUBLICATIONS

"Data–book of National Semiconductor (1996)", p. 12, Jan.

*Primary Examiner*—Stephen Jackson

[57] ABSTRACT

A power source circuit includes switch for connecting and disconnecting a power source to and from a circuit proper; stabilizing means for suppressing a variation of an input voltage to stabilize the input voltage; voltage increasing means for increasing the input voltage in amplitude; switching means for controlling a voltage increasing operation; rectifying means for rectifying a switching waveform; smoothing means for smoothing a rectified waveform; and control means for controlling an output voltage to be constant in amplitude. In the power source circuit, the start of operating the power source circuit is delayed behind the start of supplying electric power. Therefore, it is prevent a power source circuit from failing to operate under the condition that a power source of a large internal resistance is coupled thereto, and the rush current, for example, causes the power source voltage drop.

9 Claims, 5 Drawing Sheets

FIG. 6
PRIOR ART ized into a PWM (Pulse Width Modulation) converter which is operated by a rectangular waveform signal and an oscillation type converter which is operated by a sinusoidal waveform signal, when categorized on the basis of the waveforms of the switching signal. The PWM converter of the voltage increasing type will be described for the prior art of the present invention.

POWER SOURCE CIRCUIT

BACKGROUND OF THE INVENTION

The present invention relates to a power source circuit for use with a battery-driven portable device.

A switching power source is frequently used for the power source of a portable device because it may be reduced in size and weight. The switching power source may be categorized into a PWM (Pulse Width Modulation) converter which is operated by a rectangular waveform signal and an oscillation type converter which is operated by a sinusoidal waveform signal, when categorized on the basis of the waveforms of the switching signal. The PWM converter of the voltage increasing type will be described for the prior art of the present invention.

Figure 6:
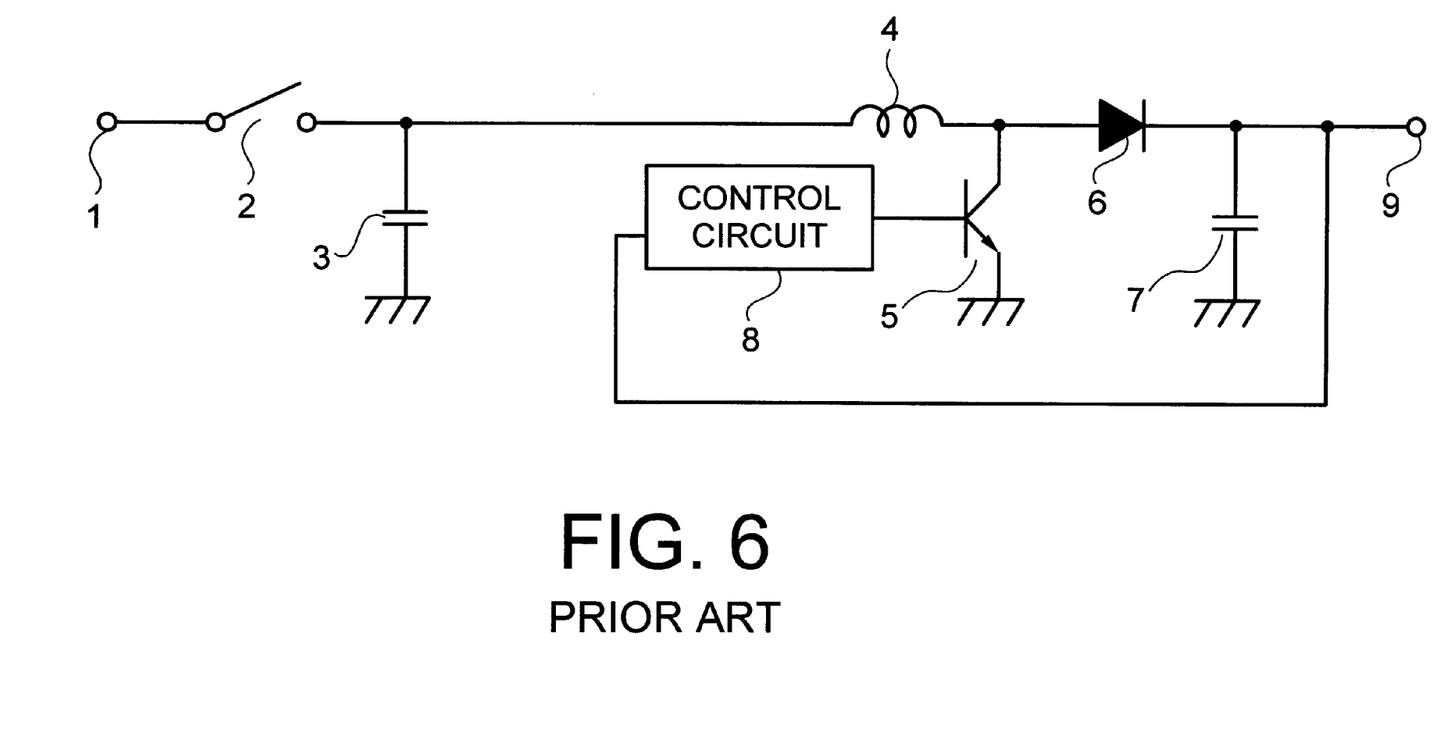
FIG. 6 is a block diagram of an equivalent circuit of a conventional power source circuit.

FIG. 6 is a block diagram of an equivalent circuit of a prior power source circuit. In the figure, reference numeral 1 is an input terminal of the power source circuit connected to a power source (not shown), e.g., a battery; 2 is an element (referred to as a switch), which operates like a switch and functions to connect and disconnect the power source connected to the equivalent circuit to and from the circuit proper of the power source circuit; 3 is an element (referred to as an input capacitor) which operates like a capacitor and functions to stabilize the power source voltage or an input voltage to the circuit proper of the power source circuit; 4 is an element (referred to as an inductance) which operates like an inductance for storing electric energy; 5 is an element (referred to as a transistor) which operates like a switching transistor; 6 is an element (referred to as a diode) which operates like a rectifying diode; 7 is an element (referred to as an output capacitor) which operates like a capacitor for smoothing the rectified waveform of the input voltage; 8 is a control circuit for controlling the output voltage so that it takes a constant voltage value; and 9 is an output terminal connected to a load circuit.

The operation of the prior power source circuit thus constructed will be described. A battery is used for the power source in the power source circuit. A d.c. voltage is applied from the battery to the input terminal 1. The d.c. voltage goes from the input terminal 1 to one of the terminals of the switch 2. The other terminal of the switch 2 is connected to the circuit proper of the power source circuit. When those terminals of the switch 2 are disconnected from each other (viz., the switch 2 is in an open state), no electric power is supplied from the power source to the circuit proper of the power source circuit. When the terminals of the switch 2 are connected to each other (viz., the switch 2 is in a close state), the electric power is supplied from the power source to the circuit proper. When the switch 2 is in a close state, the input d.c. current is fed to the input capacitor 3 to charge the same, while at the same time it is fed to the inductor 4 and its subsequent circuitry. When a load current abruptly increases, the input capacitor 3 is discharged to suppress the resultant variation of the input voltage to stabilize the input voltage. When the transistor 5 is in an on state, the inductor 4 is excited to store energy therein. When the transistor 5 is in an off state, a magnetic flux developed by the inductor 4 is reset and the energy stored in the inductor 4 is discharged to the diode 6 and the subsequent circuitry.

When the cathode potential is lower than the anode potential, the diode 6 is rendered conductive (turned on) to charge the output capacitor 7. When the cathode potential is higher than the anode potential (e.g., when the transistor 5 is turned on), the diode 6 is rendered nonconductive (turned off). In a state that the diode 6 is turned off, the output capacitor 7 is discharged, and the discharging current flows into the load circuit that is connected to the output terminal 9. The control circuit 8 monitors potential at the output terminal 9. Specifically, it compares the potential with a reference potential or voltage, and controls the turning on and off of the transistor 5 on the basis of the comparison result so as to keep the output voltage constant. Further, the control circuit 8 also monitors the current flowing through the transistor 5, and controls the turning on and off of the transistor 5 on the basis of the result of the monitoring so as to restrict the current within a predetermined range of current. The control circuit 8 controls the turning on and off of the transistor 5 by varying the frequency where one cycle is defined by the time period between an on time point and an off time point of the transistor, varying the duty cycle of the time period, interrupting the switching operation, or another suitable method.

Immediately after the switch 2 is turned on, the output voltage is 0 V. Therefore, the control circuit 8 turns on the transistor 5 to increase the output voltage. When the switch 2 is turned on, a current to charge the input capacitor 3 and a current to excite the inductor 4 (the current flowing through the inductor 4 and the transistor 5), which are fed from the power source, simultaneously flow to those elements from the power source. A large current, which is required immediately after the switch 2 is turned on, flows through the power source. As a result, the power source voltage, or the input voltage, greatly drops by the internal resistance of the battery. The input voltage serves also as a power source voltage to the control circuit 8. Accordingly, if the input voltage is greatly reduced, the control circuit 8 possibly fails to operate. If the control circuit 8 is not operated in a state that the transistor 5 is in an on state, the current flowing through the transistor 5 continues. The result is that the input voltage remains low and no output voltage is frequently produced.

An operation of the prior power source circuit thus constructed will be described hereunder. The following specific example will be used for the operation description: the peak rush current to the input capacitor 3 is 1.5 A; the maximum collector current of the transistor 5 is 2 A; the minimum operating power source voltage of the control circuit 8 is 1.8 V; the initial battery voltage is 3.2 V; and the internal resistance of battery is 0.5Ω. When the rush current peaks, the output voltage of the battery drops by a voltage given below (1.5 A+2 A)×0.5Ω=1.75 V That is, the input voltage drops from its initial voltage by 1.75 V, and the resultant input voltage is 1.45 V: 3.2 V−1.75 V=1.45 V. This input voltage value, 1.45 V, is lower than 1.8 V of the minimum operation power source voltage of the control circuit 8: 1.45 V<1.8 V. Thus, in the prior power source circuit, when the rush current to the input capacitor 3 reaches its peak value immediately after the switch 2 is turned on, the transistor 5 is left turned on, and the control circuit 8 possibly fails to operate.

Since the prior power source circuit is thus constructed, it possibly fails to operate even if the switch 2 is turned on.

SUMMARY OF THE INVENTION

Accordingly, an object of the present invention is to provide a power source circuit which never fails to operate under the condition that a power source of a large internal resistance is coupled thereto, and the rush current, for example, causes the power source voltage drop.

According to an aspect of the present invention, there is provided a power source circuit comprising: a switch for connecting and disconnecting a power source to and from a circuit proper; stabilizing means for suppressing a variation of an input voltage to stabilize the input voltage; voltage increasing means for increasing the input voltage in amplitude; switching means for controlling a voltage increasing operation; rectifying means for rectifying a switching waveform; smoothing means for smoothing a rectified waveform; and control means for controlling an output voltage to be constant in amplitude; wherein the start of operating the power source circuit is delayed behind the start of supplying electric power.

According to another aspect of the present invention, there is provided a power source circuit comprising: a switch for connecting and disconnecting a power source to and from a circuit proper; stabilizing means for suppressing a variation of an input voltage to stabilize the input voltage; voltage increasing means for increasing the input voltage in amplitude; switching means for controlling a voltage increasing operation; rectifying means for rectifying a switching waveform; smoothing means for smoothing a rectified waveform; and control means for controlling an output voltage to be constant in amplitude; wherein after passing through the switch, the input voltage is passed through a low-pass filter and then is supplied as a power source voltage to the control means.

According to still another aspect of the present invention, there is provided a power source circuit comprising: a switch for connecting and disconnecting a power source to and from a circuit proper; stabilizing means for suppressing a variation of an input voltage to stabilize the input voltage; voltage increasing means for increasing the input voltage in amplitude; switching means for controlling a voltage increasing operation; rectifying means for rectifying a switching waveform; smoothing means for smoothing a rectified waveform; and control means for controlling an output voltage to be constant in amplitude; wherein a charge storage element is coupled to the power source side of the switch.

According to still another aspect of the present invention, there is provided a power source circuit comprising: a switch for connecting and disconnecting a power source to and from a circuit proper; stabilizing means for suppressing a variation of an input voltage by a charge storage means to stabilize the input voltage; voltage increasing means for increasing the input voltage in amplitude; switching means for controlling a voltage increasing operation; rectifying means for rectifying a switching waveform; smoothing means for smoothing a rectified waveform; control means for controlling an output voltage to be constant in amplitude; and a charge storage element coupled to the power source side of the switch; wherein a capacity of the charge storage element coupled to the power source side of the switch is larger than that of the charge storage capacity of the stabilizing means.

In a power source circuit constructed according to the present invention, the start of operating the power source circuit is delayed behind the start of supplying electric power. Therefore, there is no chance that the current required at the start of supplying electric power and the current required at the start of operating the power source circuit simultaneously flow. The input voltage drop is small, and the power source circuit never fails to operate.

Further, in the power source circuit of the invention, the input voltage derived from the switch is passed through a low-pass filter to reduce noise components contained therein. Thus, the input voltage, after its noise reduction, is supplied as a power source voltage to the control means. Therefore, the control circuit never fails to operate.

Further, in the power source circuit of the invention, a charge storage element is coupled to the power source side of the switch. The charge storage element forms an auxiliary battery which has stored electric charge before the switch is turned on. The large current, which is required immediately after the switch is turned on, is fed from the power source and the charge storage element as well. Therefore, the voltage drop of the input voltage, or the power source voltage, is reduced. And there is no chance that the power source circuit fails to operate.

In the power source circuit of the invention, a capacity of the charge storage element coupled to in the power source side of the switch is large, while a capacity of the charge storage capacity of the stabilizing means is small. The result is that the rush current flowing upon the turning on of the switch is reduced, the voltage drop of the input voltage is lessened, and the power source circuit never fails to operate.

DETAILED DESCRIPTION OF THE PREFERRED EMBODIMENTS

Power source circuits constructed according to the present invention will be described in detail with reference to the accompanying drawings.

First Embodiment

Figure 1:
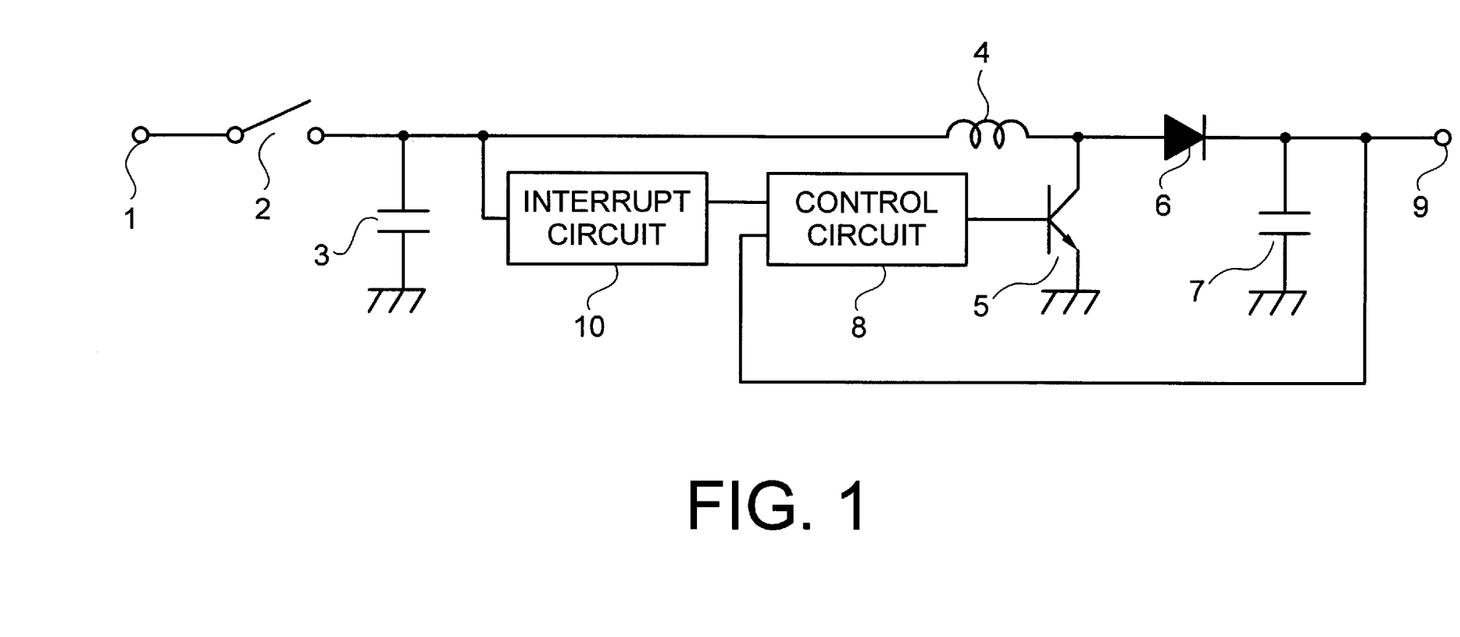
FIG. 1 is a block diagram of an equivalent circuit of a power source circuit according to first embodiment of the present invention.

A first embodiment of the present invention, which is a power source circuit, will first be described. The power source circuit of the first embodiment may be equivalently depicted as in FIG. 1. The power source circuit is equivalently depicted for ease of understanding the blocks therein. In FIG. 1, reference numeral 10 is an interrupting circuit for interrupting the operation of the control circuit 8. The remaining circuit elements and components in this circuit are the same as those in the FIG. 6 circuit already described in the prior art description.

The operation of the power source circuit will be described hereunder. When the switch 2 is in a close state, an input d.c. current is fed to the input capacitor 3, the circuitry subsequent to the inductor 4 and the interrupting circuit 10. The input capacitor 3 is charged by the input d.c. current. The interrupting circuit 10 produces a signal for transmission to the control circuit 8. The signal inhibits the control circuit 8 from operating for a preset time after the switch 2 is turned on. In other words, the control circuit 8 does not operate till it receives the signal from the interrupting circuit 10. When the control circuit 8 is inoperable, the transistor 5 is in an off state. The operations of the remaining circuitry are the same as of the FIG. 6 power source circuit, and hence no further description of them will be given here.

Upon turning on of the switch 2, the interrupting circuit 10 interrupts the operation of the control circuit 8. Also at this time, the charging of the input capacitor 3 starts. No current flows to the transistor 5 yet at this time. After a time enough to charge the input capacitor 3 elapses, the interrupting circuit 10 triggers the control circuit 8 to operate. When the control circuit 8 operates, current flows through the inductor 4 and the transistor 5, to thereby excite the inductor 4. In this case, the flow of such a large current as a rush current never occurs since the input capacitor 3 has already been charged. Therefore, there is no chance that the current for charging the input capacitor 3 and the current for exciting the inductor 4 (the current flowing through the inductor 4 and the transistor 5) simultaneously flow. Further, the internal resistance of the battery does not decrease the power source voltage or the input voltage to such an extent as to cause the control circuit 8 to fail to operate. Therefore, a normal operation of the power source circuit and the outputting of a normal output voltage from the power source circuit are ensured.

The specific example used in the operation description of the prior power source circuit is used again here. As recalled, the specific example was: the peak rush current to the input capacitor 3 is 1.5 A; the maximum collector current of the transistor 5 is 2 A; the minimum operating power source voltage of the control circuit 8 is 1.8 V; the initial battery voltage is 3.2 V; and the internal resistance of the battery is 0.5Ω. At the peak rush current, the output voltage of the battery drops by 0.75 V: 1.5 A×0.5Ω=0.75 V. In other words, the input voltage drops 0.75 V from its initial voltage. Then, the input voltage is 2.45 V: 3.2 V−0.75 V=2.45 V. The input voltage, 2.45 V, is much larger than the minimum operation power source voltage, 1.8 V, of the control circuit 8: 2.45 V>1.8 V. No problem arises in the operation of the control circuit 8, as clearly seen.

The voltage drop of the output voltage of the battery when the current flowing through the inductor 4 and the transistor 5 peaks is 1.0 V: 2 A×0.5Ω=1.0 V. In other words, the input voltage drops 1.0 V from its initial voltage, and hence it is 2.2 V : 3.2 V−1.0 V=2.2 V. The input voltage, 2.2 V, is sufficiently larger than the minimum operation power source voltage, 1.8 V, of the control circuit 8: 2.2 V>1.8 V. No problem arises. In a situation where the current flows through the inductor 4 and the transistor 5, the input capacitor 3 has already been charged. Accordingly, in this situation, the input capacitor 3 supplementarily supplies current to the circuit proper, and hence there is no need of supplying all the required current from the battery. Therefore, it is estimated that an actual voltage drop across the battery will be smaller than the calculated one. Thus, the large current flows at different times. Therefore, the input voltage or the battery voltage drop is lessened. The control circuit 8 operates without fail when the switch is turned on. In other words, the power source circuit normally operates and produces a normal output voltage.

Figure 2:
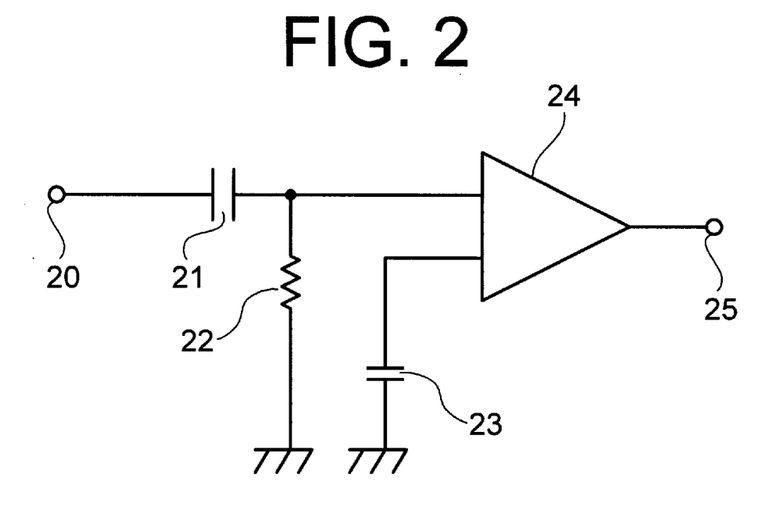
FIG. 2 is a block diagram of an equivalent circuit of an example arrangement of an interrupting circuit in the power source circuit of FIG. 1.

FIG. 2 illustrates an equivalent circuit of an example arrangement of the interrupting circuit 10. In the figure, reference numeral 20 is an input terminal for receiving an input voltage through the switch 2; 21 is a capacitor; 22 is a resistor; 23 is a reference voltage source; 24 is a comparator; and 25 is an output terminal for outputting a signal to the control circuit 8.

Figure 3:
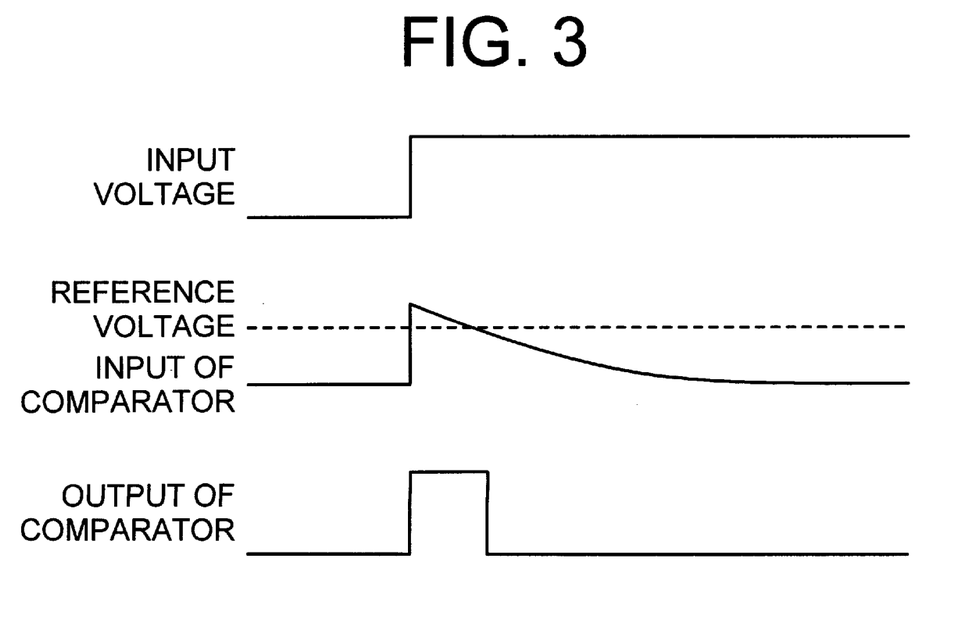
FIG. 3 shows a set of waveforms of signals useful in explaining the operation of the interrupting circuit of FIG. 2.

A set of waveforms of signals useful in explaining the operation of the interrupting circuit 10 is shown in FIG. 2. Description of the operation of the interrupting circuit 10 will be given with reference to FIGS. 2 and 3. The input voltage applied to the input terminal 20 rises at the turning on of the switch 2. The capacitor 21 and the resistor 22 make up a high-pass filter. The filter produces a signal of a waveform representative of the result of differentiating a variation of the input voltage, and applies it to one of the input terminals of the comparator 24. The reference voltage source 23 produces a preset voltage for transmission to the other terminal of the comparator 24. The comparator 24 compares the output signal of the high-pass filter with the reference voltage, or the preset voltage from the reference voltage source 23. When the former is larger than the latter, the comparator 24 outputs a logic signal of high level at the output terminal 25. When the former is smaller than the latter, it produces a logic signal of a low level. Immediately after the switch 2 is turned on, the interrupting circuit 10 sends a logic signal of high level to the control circuit 8 for a period of time that the control circuit 8 is to be interrupted in its operation, to thereby stop the operation of the control circuit 8 for that period.

Second Embodiment

Figure 4:
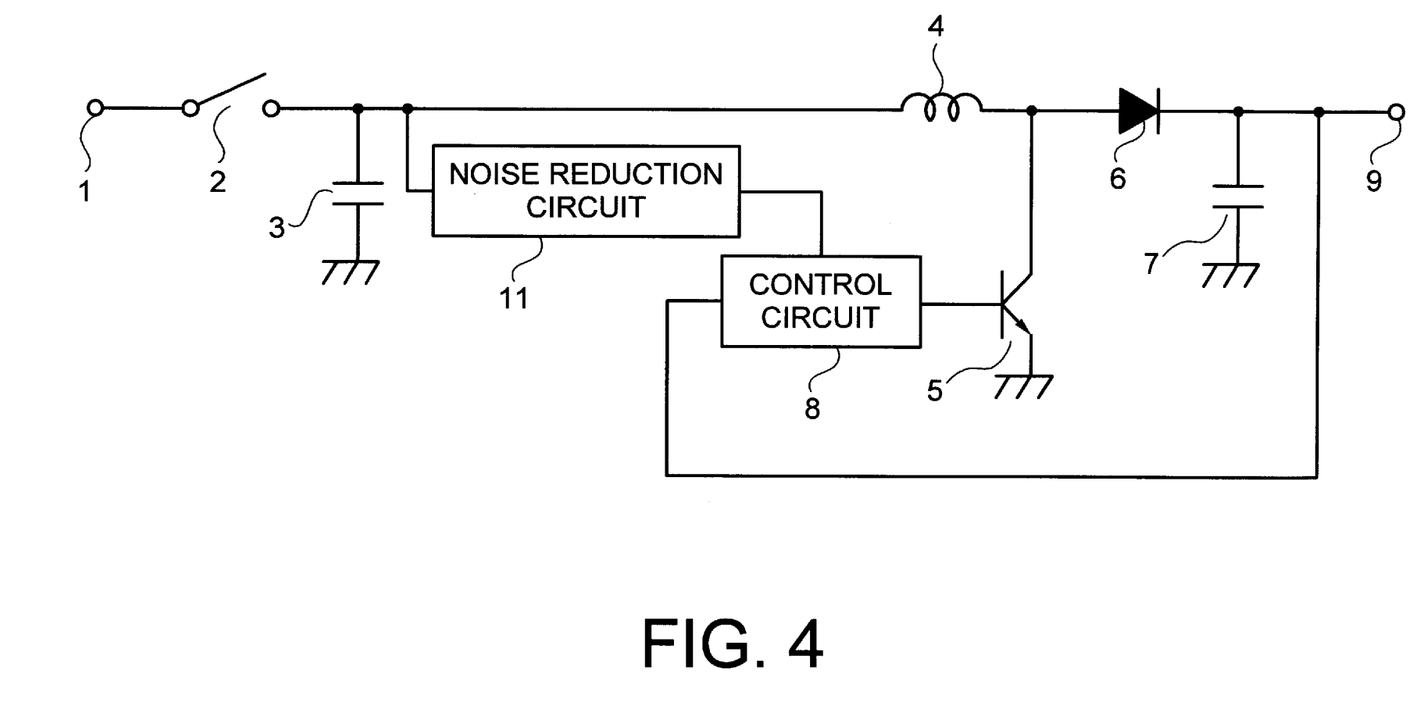
FIG. 4 is a block diagram of an equivalent circuit of a power source circuit according to second embodiment of the present invention.

FIG. 4 is a block diagram of an equivalent circuit of a power source circuit which is second embodiment of the present invention. The power source circuit is depicted in the form of an equivalent circuit for ease of understanding the operations of the respective blocks. In the figure, reference numeral 11 designates a noise reduction circuit for reducing noise contained in the power source voltage for operating the control circuit 8. The noise reduction circuit 11 is a low-pass filter which suppresses a noise component of high frequencies but allows a noise component of low frequencies to pass therethrough. The remaining circuit elements and others are the same as of the FIG. 6 circuit already described.

The operation of the power source circuit of the second embodiment thus constructed will be described. When the switch 2 is in a close state, an input d.c. current is fed to the input capacitor 3, the circuitry subsequent to the inductor 4, and the noise reduction circuit 11. The input capacitor 3 is charged by the input d.c. current. The noise reduction circuit 11 reduces noise contained in the input voltage and applied the noise-reduced input voltage to the control circuit 8, to thereby drive the same. The other operation description of the power source circuit is the same as of the FIG. 6 circuit.

How the power source circuit not using the noise reduction circuit 11 operates will first be described in connection with the noise contained in the power source voltage. Immediately after the switch 2 is turned on, the output voltage of the power source circuit is 0 V. Then, the control circuit 8 recognizes this voltage state and turns on the transistor 5 to increase the output voltage. When the switch 2 is turned on, a current to charge the input capacitor 3 and a current to excite the inductor 4 (the current flows through the inductor 4 and the transistor 5) are simultaneously fed to those circuit elements from the power source. A large current, which is required immediately after the switch 2 is turned on, flows through the power source. As a result, the power source voltage, or the input voltage, drops by the internal resistance of the power source. In this case, even if the reduced power source voltage is within the range of voltage values which enables the control circuit 8 to operate, the control circuit 8 sometimes fails to operate. The reason for this is that noise is contained in the reduced power source voltage, and at some negative peaks of the noise, the power source voltage decreases to below the lower limit value of voltage to drive the control circuit 8, and as a result, the control circuit 8 fails to operate. In a state that the transistor 5 is in an on state and the control circuit 8 is not operated, the current continues to flow through the transistor 5. Therefore, the input voltage, or the power source voltage, is left low irrespectively of presence of the noise component, and no output voltage is possibly produced. It sometimes happens that the negative peak of the noise contained in the input voltage triggers the power source circuit to fix the input voltage to a low voltage.

How the power source circuit using the noise reduction circuit 11 operates will now be described in connection with the noise contained in the power source voltage.

Immediately after the switch 2 is turned on, the output voltage of the power source circuit is 0 V. Then, the control circuit 8 recognizes this voltage state and turns on the transistor 5 to increase the output voltage. When the switch 2 is turned on, a current to charge the input capacitor 3 and a current to excite the inductor 4 (the current flows through the inductor 4 and the transistor 5) are simultaneously fed to those circuit elements. A large current, which is required immediately after the switch 2 is turned on flows through the power source. As a result, the power source voltage, or the input voltage, drops by the internal resistance of the power source. In this case, even if the reduced power source voltage is within the range of voltage values which enables the control circuit 8 to operate, the control circuit 8 normally operates while not being influenced by the noise component. Therefore, the power source circuit also normally operates to produce a correct output voltage.

Third Embodiment

Figure 5:
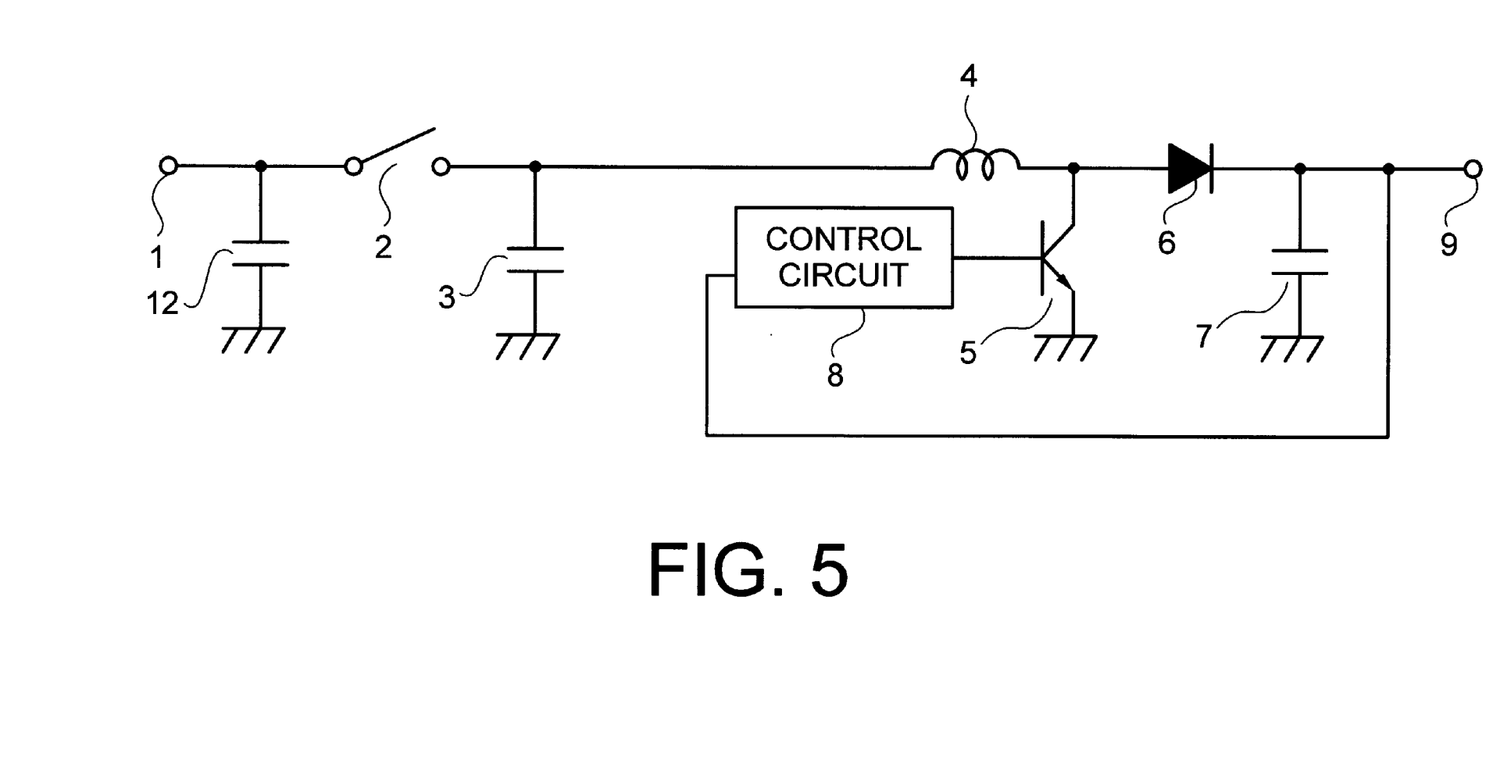
FIG. 5 is a block diagram of an equivalent circuit of a power source circuit according to third and fourth embodiments of the present invention.

FIG. 5 is a block diagram of an equivalent circuit of a power source circuit which is third embodiment of the present invention. The power source circuit is depicted in the form of an equivalent circuit for ease of understanding the operations of the respective blocks. In the figure, reference numeral 12 is an element (referred to as a capacitor) which operates like a capacitor and functions to stabilize the input voltage. The remaining circuit elements and components in this circuit are the same as those in the FIG. 6 circuit already described in the prior art description.

The operation of the power source circuit thus arranged will be described. A d.c. voltage is applied from the battery to the input terminal 1. The d.c. voltage goes from the input terminal 1 to one of the terminals of the switch 2. The other terminal of the switch 2 is connected to the circuit proper of the power source circuit. When those terminals of the switch 2 are disconnected from each other, no electric power is supplied from the power source to the circuit proper of the power source circuit. When the terminals of the switch 2 are connected to each other, the electric power is supplied from the power source to the circuit proper. When the switch 2 is in a close state, the input d.c. current is fed to the input capacitor 3 to charge the same, while at the same time it is fed to the inductor 4 and its subsequent circuitry. When a load current abruptly increases, the input capacitor 3 and the capacitor 12 (power source capacitor) directly connected to the power source is discharged to suppress the resultant variation of the input voltage to stabilize the input voltage. The subsequent operation of the power source circuit is the same as of the FIG. 6 circuit of the prior art, and hence no further description of it will be given.

The power source capacitor 12 have been charged before the switch 2 is turned on. Immediately after the switch 2 is turned on, the output voltage of the power source circuit is 0 V. Then, the control circuit 8 recognizes this voltage state and turns on the transistor 5 to increase the output voltage. When the switch 2 is turned on, a current to charge the input capacitor 3 and a current to excite the inductor 4 (the current flows through the inductor 4 and the transistor 5) are simultaneously fed to those circuit elements, from the power source and the power source capacitor 12. A large current, which is required immediately after the switch 2 is turned on, flows through the power source. As a result, the power source voltage, or the input voltage, drops by the internal resistance of the power source. It is noted that the large current required immediately after the switch 2 is turned on is fed from the power source and the power source capacitor 12 as well. Therefore, the voltage drop of the input voltage or the power source voltage by the internal resistance of the battery is lessened when comparing with the voltage drop thereof in the case where the large current is fed from only the power source. Since the voltage drop of the input voltage, which serves also as a power source voltage to the control circuit 8, is thus lessened, there is no chance that the control circuit 8 fails to operate. Therefore, the power source circuit normally operates and produces a normal output voltage.

Fourth Embodiment

FIG. 5 is a block diagram of an equivalent circuit of a power source circuit which is fourth embodiment of the present invention. The circuit arrangement of the fourth embodiment is substantially the same as of the third embodiment. In the fourth embodiment, a capacitance of the power source capacitor 12 is much larger than that of the input capacitor 3. The capacitance ratio of those capacitors is about 10. In a specific example, the capacitance of the input capacitor 3 is 20 $\mu$F, and that of the power source capacitor 12 is 200 $\mu$F.

The operation of the power source circuit thus arranged will be described. A d.c. voltage is applied from the battery to the input terminal 1. The d.c. voltage goes from the input terminal 1 to one of the terminals of the switch 2. The other terminal of the switch 2 is connected to the circuit proper of the power source circuit. When those terminals of the switch 2 are disconnected from each other, no electric power is supplied from the power source to the circuit proper of the power source circuit. When the terminals of the switch 2 are connected to each other, the electric power is supplied from the power source to the circuit proper. When the switch 2 is in a close state, the input d.c. current is fed to the input capacitor 3 to charge the same, while at the same time it is fed to the inductor 4 and its subsequent circuitry. When a load current abruptly increases, the input capacitor 3 and the capacitor 12 (power source capacitor) directly connected to the power source is discharged to suppress the resultant variation of the input voltage to stabilize the input voltage. The subsequent operation of the power source circuit is the same as of the FIG. 6 circuit of the prior art, and hence no further description of it will be given.

The power source capacitor 12 have been charged before the switch 2 is turned on. Immediately after the switch 2 is turned on, the output voltage of the power source circuit is 0 V. Then, the control circuit 8 recognizes this voltage state and turns on the transistor 5 to increase the output voltage. When the switch 2 is turned on, a current to charge the input capacitor 3 and a current to excite the inductor 4 (the current flows through the inductor 4 and the transistor 5) are simultaneously fed to those circuit elements, from the power source and the power source capacitor 12. A large current, which is required immediately after the switch 2 is turned on, flows through the power source. As a result, the power source voltage, or the input voltage, drops by the internal resistance of the power source. It is noted that the large current required immediately after the switch 2 is turned on is fed from the power source and the power source capacitor 12 as well. Since the capacitance of the input capacitor 3 is much smaller than that of the power source capacitor 12, the input capacitor 3 can be charged by the charge stored in the power source capacitor 12. Therefore, a reduced rush current flowing into the input capacitor 3. Hence, the voltage drop of the input voltage or the power source voltage by the internal resistance of the battery is lessened when comparing with the voltage drop thereof in the case where the large current is fed from only the power source. There is no chance that the control circuit 8 fails to operate. Therefore, the power source circuit normally operates and produces a normal output voltage.

The present invention thus constructed has the following useful effects.

The start of operating the power source circuit is delayed behind the start of supplying electric power. Therefore, there is no chance that the current required at the start of supplying electric power and the current required at the start of operating the power source circuit simultaneously flow. The input voltage drop is small, and the power source circuit never fails to operate.

The noise components contained in the power source voltage are reduced. Therefore, a reliable operation of the control circuit is secured.

Further, a charge storage element is coupled to the power source side of the switch. The charge storage element forms an auxiliary battery which has stored electric charge before the switch is turned on. The large current, which is required immediately after the switch is turned on, is fed from the power source and the charge storage element as well. Therefore, the voltage drop of the input voltage, or the power source voltage, is reduced. And there is no chance that the power source circuit fails to operate. Since the charge storage element is coupled to the power source side of the switch, there is no need of coupling a large charge storage element to the load side of the switch. The result is that the rush current flowing upon turning on of the switch is reduced, the voltage drop of the input voltage is lessened, and a reliable operation of the power source circuit is ensured.

A capacity of the charge storage element coupled to in the power source side of the switch is large, while a capacity of the charge storage capacity of the stabilizing means is small. The result is that the rush current flowing upon the turning on of the switch is reduced, the voltage drop of the input voltage is lessened, and the power source circuit never fails to operate.

What is claimed is:

1. A power source circuit comprising:

a switch for connecting and disconnecting a power source to and from a circuit proper;

stabilizing means for suppressing a variation of an input voltage to stabilize the input voltage;

voltage increasing means for increasing the input voltage in amplitude;

switching means for controlling a voltage increasing operation;

rectifying means for rectifying a switching waveform;

smoothing means for smoothing a rectified waveform;

control means powered by the input voltage for controlling an output voltage to be constant in amplitude; and delay means for delaying activation of said control means for a predetermined time period after said switch connects to said power source until said stabilizing means stores a predetermined amount of energy so that input voltage to said control means exceeds a threshold voltage.

2. A power source circuit comprising:

a switch for connecting and disconnecting a power source to and from a circuit proper;

stabilizing means for suppressing a variation of an input voltage to stabilize the input voltage;

voltage increasing means for increasing the input voltage in amplitude;

switching means for controlling a voltage increasing operation;

rectifying means for rectifying a switching waveform;

smoothing means for smoothing a rectified waveform;

control means for controlling an output voltage to be constant in amplitude; and a low-pass filter for receiving the input voltage after passing through said switch and supplying the same to said control means as a power source voltage.

3. A power source circuit comprising:

a switch for connecting and disconnecting a power source to and from a circuit proper;

stabilizing means for suppressing a variation of an input voltage to stabilize the input voltage;

voltage increasing means for increasing the input voltage in amplitude;

switching means for controlling a voltage increasing operation;

rectifying means for rectifying a switching waveform;

smoothing means for smoothing a rectified waveform;

control means for controlling an output voltage to be constant in amplitude; and a charge storage element coupled to a power source side of said switch; wherein said stabilizing means is composed of a charge storage element, and a capacity of said charge storage element coupled to the power source side of said switch is larger than that of said charge storage capacity of said stabilizing means.

4. A power source circuit comprising:

a switch for connecting to a power source upon activation;

a stabilizing element for storing energy as a result of activation of said switch and for discharging stored energy in order to suppress variation of input voltage from the power source;

a control circuit powered by the input voltage for controlling output voltage to be constant in amplitude; and a delay circuit for delaying activation of said control circuit for a predetermined period of time after activation of said switch until said stabilizing element stores a predetermined amount of energy, wherein said stabilizing element supplies current in order to reduce an amount of current required from said power source so that input voltage to said control circuit exceeds a threshold voltage required to operate said control circuit.

5. The power source circuit according to claim 4, wherein said delay circuit includes a comparator for comparing an output of a high-pass filter with a reference voltage.

6. The power source circuit according to claim 5, wherein the output of said high-pass filter is a waveform representing differentiation of the input voltage variation.

7. The power source circuit according to claim 4, wherein activation of said control circuit results in an increase of the input voltage.

8. A power source circuit comprising:

a switch for connecting to a power source upon activation;

a stabilizing element for storing energy as a result of activation of said switch and for discharging stored energy in order to suppress variation of input voltage from the power source;

a control circuit powered by a source voltage for controlling output voltage to be constant in amplitude; and a low-pass filter for filtering the input voltage passing through said switch so that the filtered input voltage exceeds a threshold voltage required to operate said control circuit, said low-pass filter supplying the filtered input voltage as the source voltage to said control circuit.

9. The power source circuit according to claim 8, wherein said low-pass filter reduces noise contained in the input voltage.

* * * * *